US011048918B1

United States Patent
Catalano et al.

(10) Patent No.: US 11,048,918 B1
(45) Date of Patent: Jun. 29, 2021

(54) DATA CENTER CABLING VARIATION DETECTION WITH A DOCUMENTATION NOTIFICATION SYSTEM

(71) Applicant: International Business Machines Corporation, Armonk, NY (US)

(72) Inventors: Pasquale A. Catalano, Wallkill, NY (US); Schayne Bellrose, Wappingers Falls, NY (US); Prach Jerry Chuaypradit, Apex, NC (US); Christopher John Hutton, Hurley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/790,904

(22) Filed: Feb. 14, 2020

(51) Int. Cl.
*G06K 9/00* (2006.01)
*H04Q 1/02* (2006.01)
*G16Y 20/40* (2020.01)
*G07C 9/28* (2020.01)

(52) U.S. Cl.
CPC .......... *G06K 9/00288* (2013.01); *G07C 9/28* (2020.01); *G16Y 20/40* (2020.01); *H04Q 1/13* (2013.01)

(58) Field of Classification Search
None
See application file for complete search history.

(56) References Cited

U.S. PATENT DOCUMENTS

| | | | |
|---|---|---|---|
| 2011/0070767 A1 | 3/2011 | Caveney et al. | |
| 2014/0111346 A1* | 4/2014 | Pinn | H04Q 1/09 340/691.6 |
| 2015/0039788 A1* | 2/2015 | Dearing | G06F 13/20 710/18 |
| 2015/0143153 A1 | 5/2015 | German et al. | |
| 2018/0219635 A1* | 8/2018 | Sipes, Jr. | H04B 10/077 |
| 2020/0061839 A1* | 2/2020 | Deyle | B25J 9/1664 |

* cited by examiner

*Primary Examiner* — Adolf Dsouza
(74) *Attorney, Agent, or Firm* — Cantor Colburn LLP; Steven Chiu

(57) ABSTRACT

Aspects of the invention include detecting activity at a physical location in a data center and identifying a device having a connection proximate to the physical location. It is determined whether configuration documentation for the device has been updated subsequent to the detecting of the activity. A request to update the configuration documentation is sent based on determining that the configuration documentation for the device has not been updated subsequent to the detecting.

20 Claims, 6 Drawing Sheets

DATA CENTER CABLING VARIATION DETECTION WITH A DOCUMENTATION NOTIFICATION SYSTEM

BACKGROUND

The present invention generally relates to data center cabling, and more specifically, to data center cabling variation detection with a documentation notification system.

A patch panel is a piece of hardware that connects various information technology (IT) devices together. Patch panels can range in size from having just a few ports to having several hundred ports. Patch panels are used in many different environments including communications closets, telephone company central offices, and data centers.

Patch panels are used in communications networks as intermediate elements between horizontal cabling (to which endpoint devices such as computers and telephones are connected) and network switches. When physical connections between endpoint devices and network switches are moved, added, or changed, patch panels are the points at which technicians complete the required moves, additions, or changes of cabling within patch panels, or patch fields. It is important to keep track of changes that are made to patch cord connections in a patch panel. Proper documentation of changes in a patch panel assures that the routing of patch cords, or cables, is always known and further assures that any future changes are completed correctly. Having accurate documentation is facilitates troubleshooting the loss of a signal link.

In large datacenter environments, keeping cabling and infrastructure documentation up to date can be challenging. Current methods are largely manual and rely on technicians to update the documents after changes have been completed.

SUMMARY

Embodiments of the present invention are directed to data center cabling variation detection with a document notification system. A non-limiting example computer-implemented method includes detecting activity at a physical location in a data center and identifying a device having a connection proximate to the physical location. It is determined whether configuration documentation for the device has been updated subsequent to the detecting of the activity. A request to update the configuration documentation is sent based on determining that the configuration documentation for the device has not been updated subsequent to the detecting.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
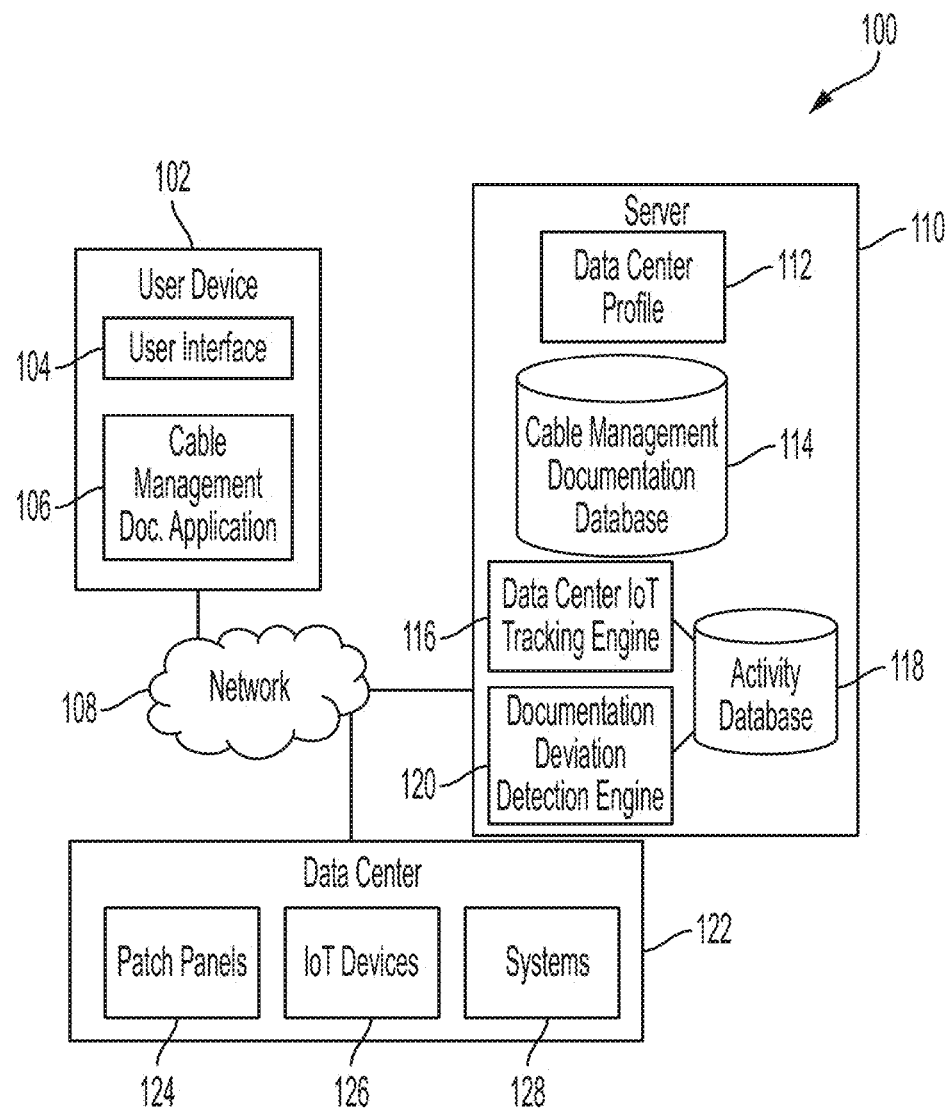
FIG. 1 depicts a block diagram of an environment for data center cabling variation detection with a document notification system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide the ability to detect activity at a patch panel and to verify that configuration documentation relating to the patch panel has been updated. In accordance with one or more embodiments of the present invention, Internet of Things (IoT) devices (e.g., cameras, badge readers, etc.) monitor patch panel locations, detect the presence of persons interacting with the infrastructure (e.g., the patch panel, the cables), and send a notification(s) to a dedicated person(s) such as the owner of the documentation that describes the infrastructure. In accordance with one or more embodiments of the present invention, the notification(s) is sent after determining that the documentation of the infrastructure has not been updated since the interaction was detected. In accordance with one or more embodiments of the present invention, if the person who interacted with a patch panel can be identified, a prediction can be made about which panels and/or cables in the infrastructure have been interacted with and a determination can be made about whether the corresponding documentation has been updated.

As known in the art, an IoT device is a piece of hardware with a sensor that transmits data from one place to another over a network. Types of IoT devices can include, but are not limited to wireless sensors, software, actuators, cameras, badge readers, and computer devices. IoT devices can be imbedded into mobile devices, industrial equipment, environmental sensors, medical devices, and more. An IoT is a system of interrelated devices that are provided with unique identifiers (UIDs) and the ability to transfer data over a network without requiring human-to-human or human-to-computer interaction.

A change to a patch panel can include but is not limited to relocation of an existing connection, removal of an existing connection, replacement of an existing connection, and addition of new connections.

One or more embodiments of the present invention provide technological improvements over current methods of documenting patch panel updates. A disadvantage of contemporary approaches is that they are largely a manual process that require a technician to remember to document any changes that they make to a patch panel. Contemporary approaches can be expensive in terms labor cost as well as error prone due for example, to human errors in forgetting to update the documentation. In addition, contemporary approaches do not have any active monitoring features to alert administrators, or owners of the documentation, when the documentation might be out of date. One or more embodiments of the present invention provide technical solutions to one or more of these disadvantages by automatically detecting activity near a patch panel and predicting what panels and/or cables have been updated. Based on this information it can be determined whether the corresponding documentation has been updated and/or an alert can be sent to the owner of the infrastructure documentation, thus ensuring that the document is kept up to date. The owner of the infrastructure documentation is a person(s) who is responsible for making sure that the infrastructure documentation reflects the current environment.

Embodiments of the present invention do not require making any changes to existing patch panels to add intelligence to detect activity at the patch panel. Instead of requiring modifications to the patch panels, one or more embodiments of the present invention use existing IoT devices (e.g., cameras, badge readers) to identify if activity has occurred near a patch panel.

Turning now to FIG. 1, a block diagram of an environment 100 for data center cabling variation detection with a document notification system is generally shown in accordance with one or more embodiments of the present invention. The components of the environment 100 shown in FIG. 1 include a user device 102, a server 110, and a data center 122 all connected to a network 108. In accordance with one or more embodiments of the present invention the user device 102, network 108, and server 110 are located in the data center 122. In accordance with one or more other embodiments of the present invention, all or a portion of the user device 102 is located on one or more processors that are remote from the data center 122, such as another data center or in a cloud computing environment. In accordance with one or more embodiments of the present invention, all or a portion of the server 110 is located on one or more processors that are remote from the data center 122, such as another data center or in a cloud computing environment.

User device 102 can be implemented by any computer device known in the art such as, but not limited to a mobile device, a tablet device, a laptop computer, and a desktop computer. The user device 102 shown in FIG. 1 includes a user interface 104 and a cable management documentation application 106 executing on the user device 102. The user interface 104 provides a user with the ability to interact with the cable management documentation application 106 to document cable infrastructure changes. The cable management documentation application 106 documents the current cable infrastructure of a data center (e.g., cable connections to patch panels 124 and system 128). The documentation can be viewed and/or modified by an authorized user via, for example the user interface 104. In accordance with one or more embodiments of the present invention, the cable management documentation application 106 is implemented by a commercially available enterprise physical connection tool (EPCT) such as, but not limited to: Galaxy VX from Schneider Electric; SmartBunker™ from Schneider Electric; and DCiM Solutions from DCiM Solutions, LLC.

The network 108 shown in FIG. 1 can be implemented by any network known the art and can be the combination of several different networks. The network 108 can include one or more wireless and/or wired networks which can be short range and/or long range.

The data center 122 contains machine resources and cables, and cabling infrastructure such as, but no limited to patch panels, physical layer switches, network room, active switches, and/or fiber terminators such as fanouts. The embodiment of the data center 122 shown in FIG. 1 includes patch panels 124, IoT devices 126, and systems 128. The patch panels 124 include the infrastructure that connects the cables. The IoT devices 126 can include, but are not limited to cameras, smart panels which require a user badge to be opened, badge readers, and other sensors. The systems 128 shown in FIG. 1 can include host machines (e.g., servers) and devices (e.g., storage, switches) that require input/output (I/O) connections such as cables (e.g., items connected to the patch panels 124). Embodiments are not limited to having a single data center 122 as shown in FIG. 1, as one or more embodiments of the present invention may support multiple data centers in multiple geographic locations.

The embodiment of the server 110 shown in FIG. 1 includes a data center profile 112, a cable management documentation database 114, a data center IoT tracking engine 116, a documentation deviation detection engine 120, and an activity database 118. The server 110 can be implemented by any computer device known in the art such as, but not limited to a laptop computer and mainframe computer. The server 110 includes a computer system to run the data center IoT tracking engine 116 and the documentation deviation detection engine 120.

In accordance with one or more embodiments of the present invention, the data center profile 112 includes, but is not limited to a data center layout, user profile data, and system profile data. The data center layout can include a physical mapping of the locations of patch panels, systems, and IoT sensors. The user profile data can include data about users interacting with the cabling infrastructure such as, but not limited to: system ownership and scope of technical responsibilities to determine for example, the type of connections they work on. The system profile data can include information regarding systems that use the cabling infrastructure such as, but not limited to: system name, Internet protocol (IP) address, and system owner. In accordance with one or more embodiments of the present invention, a system which is owned and maintained by an individual(s) will be directly connected to a specific patch panel via a serialized cable containing a number of connections. Identifying an individual in proximity to a patch panel connected to a system they maintain will suggest that user could have made a modification to patch panel cabling requiring a change in documentation.

In accordance with one or more embodiments of the present invention, the cable management documentation database 114 stores active, or current, cable documentation such as, but not limited to the endpoints of cables (e.g., system names or other identifiers) and patch panel locations (or other patch panel identifier) that connect each of the endpoints, or systems. An example embodiment of an entry in the cable management documentation database 114 includes:

TC13A-20→43139001288→SW2020-
   61→TS5720105S-112→SW20.MTP17.2→8961/
   10559GA/5/1
TC13A-20←TS4140201S-
   011←40201SA1FL1011←2964/TC13A/116

In the above example, each item represents either a port on a device, or a cable serial number (and leg/strand information for trunks). The arrows "→" and "←" represent connections between the items. "TC13A-20" is the patch panel reserved for TC13A, which in this example is the patch panel selected as the device in the database to view. TC13A-20 is listed twice to show connections in both directions. "43139001288" represents a single fiber, referred to as a jumper, which connects two patch panel locations (TC13A-20 and SW2020-61). "SW2020-61" is the patch panel reserved for switch 2020, which is made up of one 16×16 grid of single I/O connections represented in hexadecimal 0-F so this signifies the 2nd connection on the 6th column of switch 2020. "TS5720105S-112" is a fiber optic trunk that has up to 12 legs, each containing 6 individual I/O strands, so this specifically refers to the 11th leg and second strand on that leg. "SW20.MTP17.2→8961/10559GA/5/1" refers to a switch device and the specific multi-fibre connector harness leading to the blade/port on the switch.

"TC13A-20←TS4140201S-011←40201SA1FL1011" refers to the other path out of the patch panel, it enters another trunk which is shown here with two different augmentations of the trunk serial and leg/strand information. "2964/TC13A/116" refers to the end of the trunk which sits in the processor in TC13C (fixed location) and connects to physical channel identifier (PCHID) 116.

One skilled in the art will recognize that the nomenclature and features of the items described above with reference to the example entry are just examples and that other nomenclatures can be used and other items having other features can be stored in the cable management documentation database 114 and utilized by one or more embodiments of the present invention.

In accordance with one or more embodiments, the activity database 118 is updated by the data center IoT tracking engine 116 when activity is detected near infrastructure that requires documentation updates. The data center IoT tracking engine 116 performs functions that include tracking the system configuration using external IoT devices 126, and the documentation deviation detection engine 120 performs functions that include monitoring the activity database 118 to determine if documentation has been edited or modified. Data center profile 112, cable management documentation database 114 and the activity database 118 can be stored in any configuration and in any type of storage and/or memory.

An example embodiment of an entry in the activity database 118 follows:
   Area of Activity: Patch Panel R33B17
   Date (of activity): 20200130
   Time (of activity): 1739
   Duration of Activity: 00:29:39

An example embodiment of an entry in the activity database 118 that also
   includes user data follows:
   Area of Activity: Patch Panel R33B17
   Date (of activity): 20200130
   Time (of activity): 1739
   Duration of Activity: 00:29:39
   User(s): Jane Doe
   Detection (User): Badge, FaceID It is to be understood that the block diagram of FIG. 1 is not intended to indicate that the environment 100 is to include all of the components shown in FIG. 1. Rather, the environment 100 can include any appropriate fewer or additional components not illustrated in FIG. 1 (e.g., additional user devices and networks, etc.). In addition, the components can be arranged differently. For example, the cable management documentation application 106 can be executed on the server 110 and/or the activity database 118 can be remote from the server 110 and accessed via the network 108. Further, the embodiments described herein with respect to environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
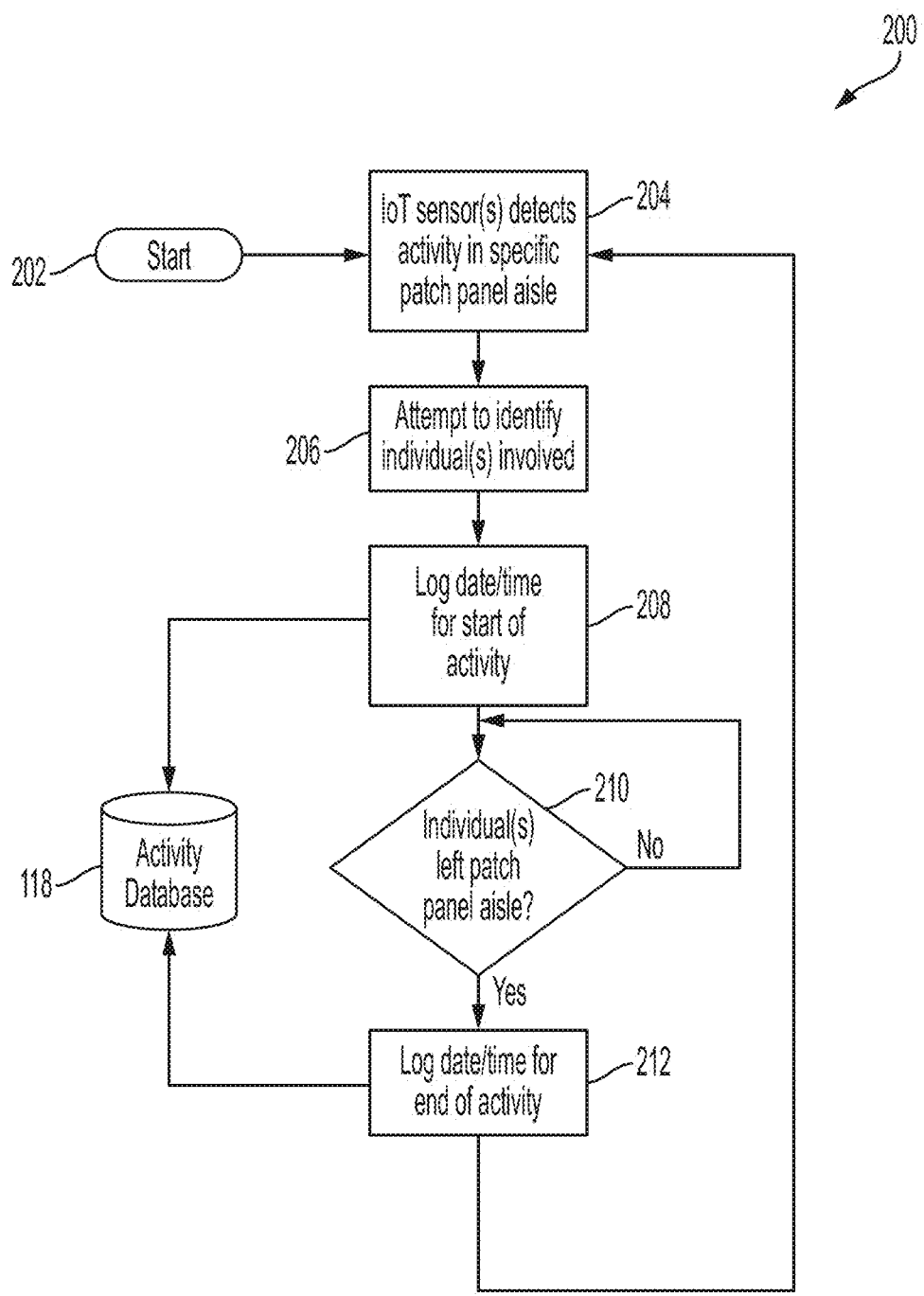
FIG. 2 depicts a process flow diagram of data center cabling variation detection according to one or more embodiments of the present invention.

Turning now to FIG. 2, a process flow diagram of a method 200 of data center cabling variation detection is generally shown in accordance with one or more embodiments of the present invention. All or a portion of the processing shown in FIG. 2 can be implemented by data center IoT tracking engine 116 of FIG. 1. The method 200 begins at block 202 and at block 204, an IoT sensor, such as an IoT device 126 of FIG. 1, monitors the data center and detects activity near, or proximate to (e.g., within a few inches, six inches, a foot, two feet, etc.), a specific patch panel, such as a patch panel 124 of FIG. 1. In an embodiment, the patch panels are laid out in aisle and rows in a data center, such as data center 122 of FIG. 1. The IoT sensors can detect activity in a specific patch panel aisle using technology such as, but not limited to: video, a badge reader, a temperature sensor, and/or a weight sensor. In other embodiments, the IoT sensors can detect activity near a group of patch panels or in front of a specific patch panel.

At block 206 of FIG. 2, an attempt is made to identify the individual(s) associated with the detected activity. In one or more embodiments of the present invention this is performed using technology such as, but not limited to: facial recognition, a badge reader, and/or a fingerprint reader. As a person walks through the data center IoT devices can receive signals from the person's badge and this can be used to detect activity and to identify the person. In addition, or alternatively, a badge reader may be located at the entrance to the data center to record individuals entering and exiting the data center, and the presence of a person in the data center can be used as an aide in identifying the individual associated with the activity detected by other IoT sensors.

Still referring to FIG. 2, at block 208, the start time and location (e.g., patch panel aisle, patch panel row, and/or patch panel number) of the detected activity is logged into an activity database 118. The activity database 118 can be implemented by activity database 118 of FIG. 1. If the person was identified at block 206, then information about the individual (e.g., employee number, name) is also logged into the activity database 118. At block 210, the method 200 monitors the location (e.g. aisle) where the activity was detected. When it is determined, at block 210, that the person has left the patch panel location, block 212 is performed and the date and the time (i.e., a timestamp) corresponding to the end of the activity is logged into the activity database 118 along with any additional user information if available. Additional information that may help in identifying the individual may be determined while the individual is in data center. The additional information can be collected by other IoT sensors such as, but not limited to a camera or fingerprint sensor. Once the end of the activity is logged, processing continues at block 204 with the IoT sensors monitoring the data center for activity and logging any detected activity into the activity database 118.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
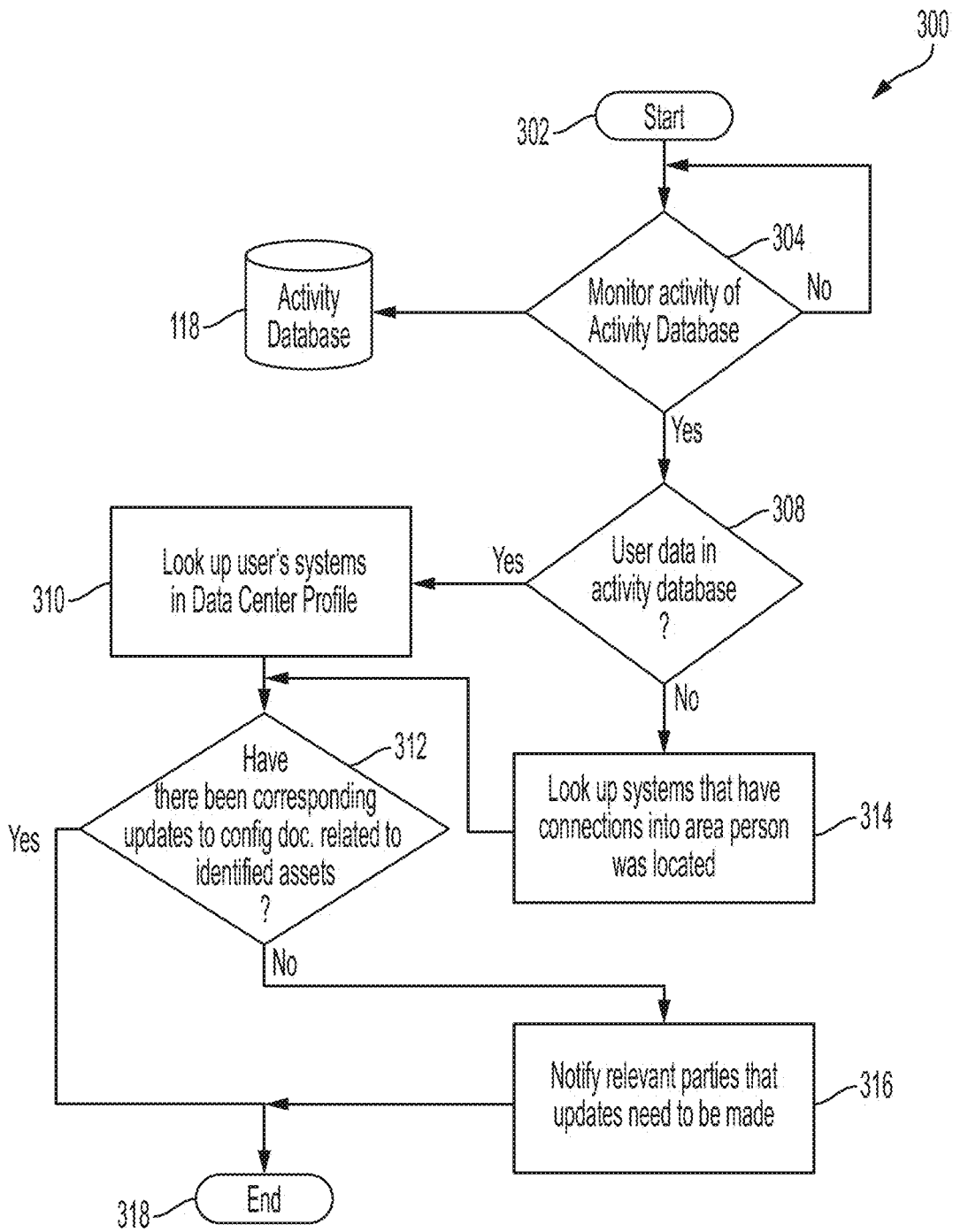
FIG. 3 depicts a process flow diagram of document deviation detection according to one of more embodiments of the present invention.

Turning now to FIG. 3, a process flow diagram of a method 300 of document deviation detection is generally shown according to one of more embodiments of the present invention. All or a portion of the processing shown in FIG. 3 can be implemented by the documentation deviation detection engine 120 of FIG. 1. The method 300 begins at block 302 and processing continues at block 304 where an activity database, such as activity database 118 of FIG. 1 is monitored for any new updates. The monitoring can happen in real-time (or near real-time) or it can be a summary of a set period of time's activity (e.g., check every twenty-four hours for any activity that has occurred). The monitoring at block 304 continues until activity is detected, at which point processing continues at block 308.

At block 308 it is determined whether the update in the activity database 118 contains user data that identifies an individual. If the activity database 118 contains data that identifies an individual associated with the activity, processing continues at block 310 with looking up what systems the identified individual is associated with (e.g., that the identified individual owns or is authorized to change) that are cabled to a location where the use activity was recorded. The identified systems are identified as possibly needing updates to their documentation. Processing continues at block 312.

If it is determined at block 308 of FIG. 3, that the activity database 118 does not include data for a detected activity that identifies an individual, processing continues at block 314. At block 314, the method looks up a system(s), such as a system 128 of FIG. 1, that has a connection into areas where the person was located. In this manner, systems that have connections that terminate in patch panels that in locations that the user activity was identified. Processing continues at block 312.

At block 312, a check is made to see if updates for the identified system(s) has been recorded in the infrastructure documentation, via for example, cable management documentation application 106 of FIG. 1. In accordance with or more embodiments of the present invention, a check is made to see if there have been any connection documentation updates to the infrastructure documentation, stored for example in cable management documentation database 114 of FIG. 1. In accordance with one or more embodiments of the present invention, timestamps are associated with any updates to the infrastructure documentation and the timestamps can be utilized to determine when any updates were made.

If it is determined at block 312 that documentation for the identified system(s) has been updated the method ends at block 318. In accordance with one or more embodiments of the present invention, the determination at block 312 includes determining that the updates to the documentation were made after the detected activity. The determining can also include only looking at updates made within a programmable threshold (e.g., one hour, one day, one week) of the logged end time of the activity. In one or more embodiments of the present invention, an amount of documentation expected to be updated can be correlated with an amount of time that the individual was performing the activity (e.g., time from logging the start of the activity to logging the end of the activity). If an expected amount of documentation has not been updated an alert can be sent to an owner of the documentation for the identified system, or other relevant party.

If it is determined at block 312 that documentation for the identified system(s) has not been updated the method continues at block 316 with notifying the relevant party(s) that updates to the documentation need to be made. A relevant party can include, but is not limited to: a system owner, a documentation owner, a user(s) identified in block 310, and/or a management team. Additional alerts can be sent out if updates are not completed within a specified timer period (e.g., a day, a week, a month) of receiving the alert. In accordance with one or more embodiments of the present invention the alert includes a relevant patch panel location, an identifier of the person who physically made the changes, and possible systems that were impacted. The alert can be sent to documentation or system owners for the possible systems that were impacted.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
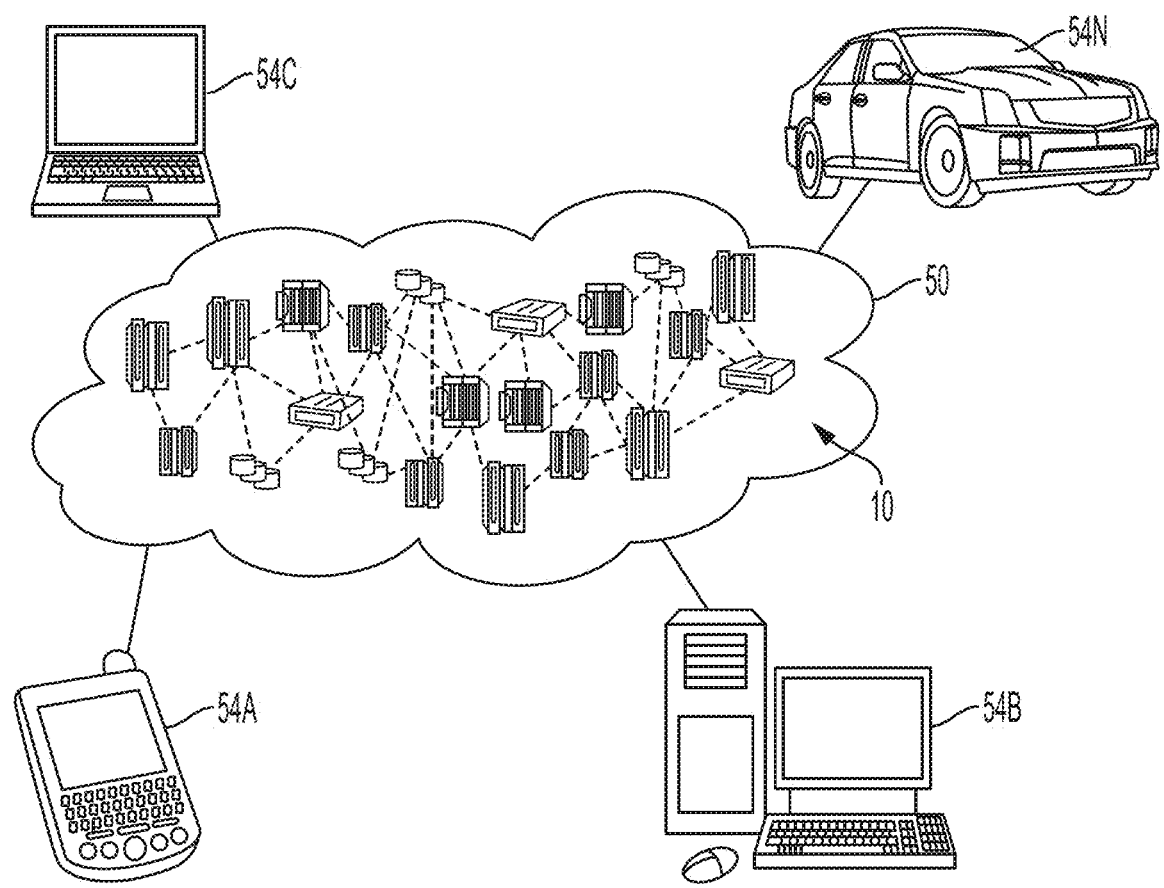
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
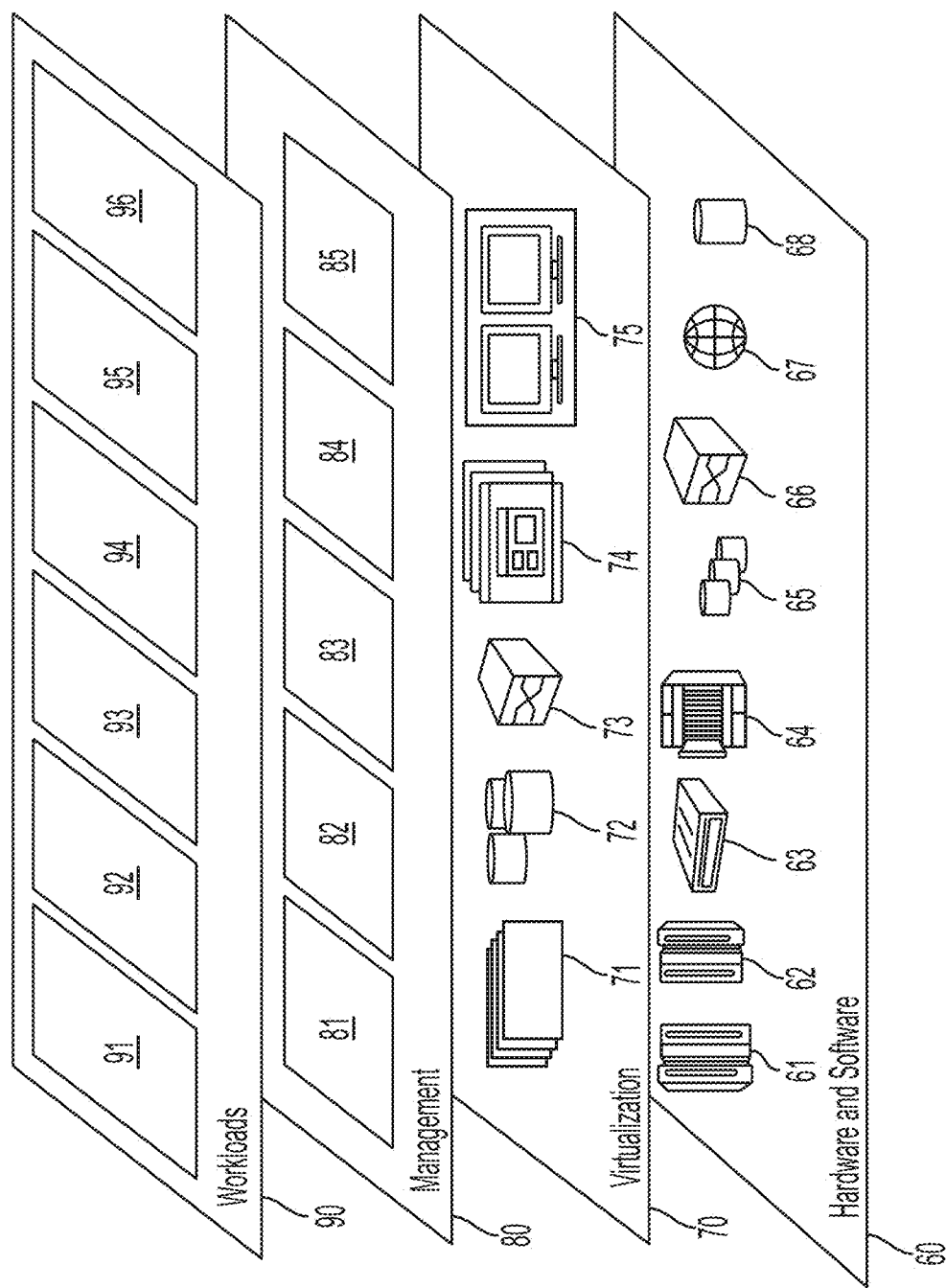
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and breakpoint generation 96.

It is understood that one or more embodiments of the present invention are capable of being implemented in conjunction with any type of computing environment now known or later developed.

Figure 6:
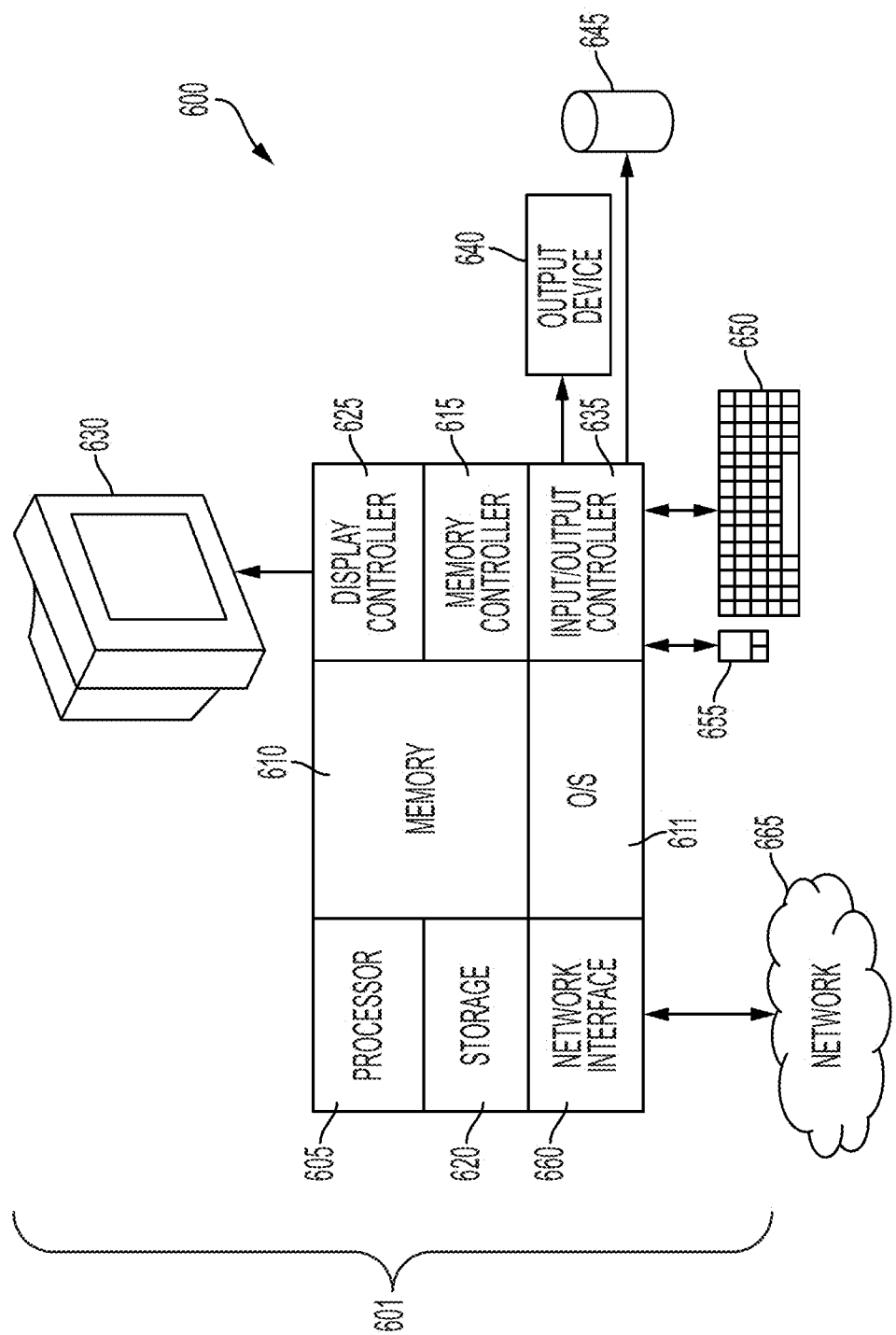
FIG. 6 illustrates a system for automatic integrity vulnerability detection in an IDE according to one or more embodiments of the present invention.

Turning now to FIG. 6, a computer system for performing all or a subset of the processing described herein is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
    detecting activity at a physical location in a data center, the detecting activity comprising identifying a person at the physical location;
    identifying a device having a connection proximate to the physical location;
    determining whether configuration documentation for the device has been updated subsequent to the detecting; and
    sending a request to update the configuration documentation based on determining that the configuration documentation for the device has not been updated subsequent to the detecting activity.

2. The method of claim 1, wherein the identifying a device is based at least in part on the identified person.

3. The method of claim 1, wherein the identifying a person is performed using facial recognition software.

4. The method of claim 1, wherein the activity is detected by a badge reader.

5. The method of claim 1, wherein the activity is detected by an Internet of things (IoT) device.

6. The method of claim 1, wherein the activity is detected by a biometric sensor.

7. The method of claim 1, further comprising monitoring the physical location using one or both of a badge reader and an IoT device, wherein the detecting is in response to the monitoring.

8. The method of claim 1, wherein the connection is via a patch panel.

9. The method of claim 1, wherein the determining and sending are performed subsequent to a specified time period elapsing after the detecting.

10. A system comprising:
    one or more processors for executing computer readable instructions, the computer readable instructions controlling the one or more processors to perform operations comprising:

detecting activity at a physical location in a data center, the detecting activity comprising identifying a person at the physical location;

identifying a device having a connection proximate to the physical location;

determining whether configuration documentation for the device has been updated subsequent to the detecting activity; and sending a request to update the configuration documentation based on determining that the configuration documentation for the device has not been updated subsequent to the detecting.

11. The system of claim 10, wherein the identifying a device is based at least in part on the identified person.

12. The system of claim 10, wherein the identifying a person is performed using facial recognition software.

13. The system of claim 10, wherein the activity is detected by a badge reader.

14. The system of claim 10, wherein the activity is detected by an Internet of things (IoT) device.

15. The system of claim 10, wherein the activity is detected by a biometric sensor.

16. The system of claim 10, wherein the operations further comprise monitoring the physical location using one or both of a badge reader and an IoT device, wherein the detecting is in response to the monitoring.

17. The system of claim 10, wherein the connection is via a patch panel.

18. The system of claim 10, wherein the determining and sending are performed subsequent to a specified time period elapsing after the detecting.

19. A computer program product comprising a computer readable storage medium having program instructions embodied therewith, the program instructions executable by a processor to cause the processor to perform operations comprising:

detecting activity at a physical location in a data center, the detecting activity comprising identifying a person at the physical location;

identifying a device having a connection proximate to the physical location;

determining whether configuration documentation for the device has been updated subsequent to the detecting activity; and sending a request to update the configuration documentation based on determining that the configuration documentation for the device has not been updated subsequent to the detecting.

20. The computer program product of claim 19, wherein the identifying a device is based at least in part on the identified person.

* * * * *